(12) United States Patent
Carlson et al.

(10) Patent No.: US 6,354,036 B1
(45) Date of Patent: Mar. 12, 2002

(54) FISHING TIP-UP DEVICE

(76) Inventors: Robert William Carlson, 1107 20th St. SO.; Keith Edward Mitchell, 1002 3rd Ave. SO., both of Virginia, MN (US) 55792

( * ) Notice: Subject to any disclaimer, the term of this patent is extended or adjusted under 35 U.S.C. 154(b) by 0 days.

(21) Appl. No.: 09/469,969

(22) Filed: Dec. 21, 1999

(51) Int. Cl.⁷ .............................................. A01K 97/12
(52) U.S. Cl. ...................................................... 43/17
(58) Field of Search ....................................... 43/16, 17

(56) References Cited

U.S. PATENT DOCUMENTS

| | | | |
|---|---|---|---|
| 123,164 A | 1/1872 | Fuller | 43/16 |
| 1,154,756 A | * 9/1915 | Georgeson | 43/17 |
| 1,819,034 A | * 8/1931 | Luelloff | 43/17 |
| 2,693,045 A | * 11/1954 | John | 43/16 |
| 2,817,176 A | 12/1957 | Harshbarger | 43/17 |
| 3,055,135 A | 9/1962 | Lewis, Jr. | 43/15 |
| 3,199,241 A | * 8/1965 | Mauritz | 43/17 |
| 3,221,705 A | * 12/1965 | Saviskas | 43/17 |
| 3,724,115 A | 4/1973 | Derie | 43/15 |
| 3,824,730 A | 7/1974 | Johnson | 43/17 |
| 3,903,634 A | 9/1975 | Miyamae | 43/21.2 |
| 4,146,988 A | 4/1979 | Bednarczyk | 43/17 |
| 4,397,113 A | 8/1983 | Pinson | 43/15 |
| 4,520,586 A | * 6/1985 | Moisan | 43/17 |
| 4,651,460 A | * 3/1987 | Sykes | 43/17 |
| 4,750,286 A | 6/1988 | Gray | 43/15 |
| 4,993,181 A | 2/1991 | Cooper | 43/15 |
| 5,050,332 A | 9/1991 | Cross | 43/15 |
| 5,050,333 A | * 9/1991 | Debreczeni | 43/17 |
| 5,152,093 A | 10/1992 | Bartys | 43/17 |
| 5,177,894 A | 1/1993 | Dunsford | 43/43.12 |
| 5,269,088 A | 12/1993 | Slaback, Jr. et al. | 43/17 |
| 6,094,852 A | * 8/2000 | Roach | 43/16 |

FOREIGN PATENT DOCUMENTS

| | | | |
|---|---|---|---|
| DE | 4219998 | * 12/1993 | |
| IT | 459478 | * 3/1951 | 43/16 |

* cited by examiner

*Primary Examiner*—Darren W. Ark
(74) *Attorney, Agent, or Firm*—Merchant & Gould P.C.

(57) ABSTRACT

The present invention is directed to a fishing device useful for indicating when a fish has struck a bait or lure. The invention is directed to a tip-up device for use in identifying a fish strike while angling. In certain implementations, the tip-up device includes a base configured and arranged to retain a removable fishing rod and reel containing fishing line, the base including a means for removably securing a handle of the rod and a means for removably securing the shaft of the rod. The tip-up device also includes a flag, the flag having a shaft with a first end configured to be flexibly secured to the base and a second end distal from the first end. A trigger mechanism is positioned on the base and contains a slot for insertion of the second end of the flag shaft, and a pivoting trip lever configured to releasably secure the fishing line.

4 Claims, 7 Drawing Sheets

FISHING TIP-UP DEVICE

FIELD OF THE INVENTION

The present invention is directed to a fishing tip-up device. More particularly, the present invention is directed to an improved fishing tip-up device suitable for use with a traditional fishing pole while ice fishing or shore fishing.

BACKGROUND

Sport fishing is an extremely popular outdoor activity enjoyed by millions of people in the United States and around the world. Sport fishing provides an opportunity to enjoy nature, to relax among friends and family, and to test one's understanding of the natural history and habitats of game fish in an effort to catch them. For many years, the most popular method of sport fishing has been fishing on open water (such as streams, lakes, ponds) with a rod and reel configured to cast a lure or bait. Such open water fishing can be conducted from boats, bridges, docks, shore, etc., and normally requires constant vigilance in order to observe whether or not a fish has bit or made a "strike" on the lure or bait.

Although open water angling remains tremendously popular, an additional popular angling method involves fishing on frozen bodies of water, most commonly lakes in upper latitudes, such as the northern portions of North America, Europe, and Asia. In these areas, lakes and other bodies of water are frequently frozen for part of the year, and traditional casting methods are inoperable because of the frozen surface. Fortunately, in many areas the winters are cool enough to produce ice thick enough to support a human, and sometimes thick enough to drive a vehicle and to construct an "ice house". In these areas it is possible to cut a hole in the ice from which to "ice fish" for various game fish, including walleye, northern pike, perch, trout, and various panfish.

Modern fish houses and fishing equipment, including insulated clothing, make it possible to comfortably spend long periods of time outside fishing through the ice. However, it is often desirable when ice fishing to be positioned some distance from your fishing gear. For example, it can be desirable on particularly cold days to drill one or more holes in the ice, to place one or more baited lines (in some jurisdictions two lines are allowed when ice fishing) out to attract and catch fish, and then to wait inside until a fish is attracted to one of the baited lines and makes a "strike" by attempting to swallow the bait. In such situations it is desirable to have a device for identifying that a fish has made a strike, at which point an angler can go to the device and catch the fish if it is secured to the line.

Such devices, also known as "tip-ups", have been used for a number of years by ice fishermen. A variety of tip-up devices are already known which indicate a strike, and certain tip-up devices are known which provide some measure of line control. Unfortunately, many of these devices have very limited functionality. Many tip-ups have very primitive reels that make it difficult to reel in large fish. Some such reels have a direct link to the handle without gearing to allow fast take-up of the line. While some tip-up devices allow for use of a separate rod and reel, these tip-up devices all have limitations that make them less than ideal for ice fishing, or other fishing where a tip-up would be useful, such as in shore fishing. These devices do not allow for sensitive bites and do not adequately allow for free flow of line after a strike has occurred. Such line flow can be critical because it allows the fish to carry off the baited hook without feeling the hook until the hook can be set by the alerted angler.

The present invention provides a simplified and reliable device giving an immediate indication of a strike while simultaneously releasing the fishing line to a free running condition thus giving the striking fish time to run and swallow the baited hook.

Accordingly, an object of the present invention is to provide an improved automatic fish tip-up and fish line control. Another object of the present invention is to provide an improved and simplified fishing rod tip-up attachment which combines an indication of a strike with a simultaneous release of the fishing line. Another object of the present invention is to provide an improved fishing rod tip-up device which permits the use of a free spool or open bail prior to the strike. Another object of the present invention is to provide an improved fishing rod tip-up device which resists unintentional release by wind or water movements. Another object of the present invention is to provide an improved fishing rod tip-up for visual signals.

SUMMARY OF THE INVENTION

The present invention is directed to a fishing device useful for indicating when a fish has struck a bait or lure. The invention is directed to a tip-up device for use in identifying a fish strike while angling. In certain implementations, the tip-up device includes a base configured and arranged to retain a removable fishing rod and reel containing fishing line, the base including a means for removably securing a handle of the rod and a means for removably securing the shaft of the rod. The tip-up device also includes a flag, the flag having a shaft with a first end configured to be flexibly secured to the base and a second end distal from the first end. A trigger mechanism is positioned on the base and contains a slot for insertion of the second end of the flag shaft, and a pivoting trip lever configured to releasably secure the fishing line. When the flag is in a first substantially horizontal position the second end of the flag may be placed within the slot of the trigger mechanism. Upon pulling on the fishing line the pivoting trip lever of he trigger mechanism rotates to expel the second end of the flag from the trigger mechanism such that the flag is free to pivot into a substantially vertical position.

In certain implementations of the invention, the means for removably securing the handle of the rod includes a channel into which the rod is placed and an elastic strap configured to be stretched over the channel once the handle has been placed within the channel. The means for removably securing the shaft of the rod may optionally include a channel into which the shaft may be inserted. In certain embodiments the shaft may be removed from the channel by lifting the rod in a vertical direction.

With regard to the flag, it may be joined to the base by a flexible spring. The base may include a peg, and the flag may be removably secured to the base by insertion of the flexible spring over the peg. While the trigger mechanism may include only one slot for insertion of the flag shaft, in certain embodiments it contains a plurality of slots for insertion of the flag shaft.

The pivoting trip lever includes a first end configured to releasably secure the fishing line, a second end configured to expel the second end of the flag from the slots, and a pivot point intermediate the first and second ends in certain embodiments. The line holder optionally comprises a bent piece of spring wire. The bent piece of spring wire has an arc configured to apply pressure to the line in some applications.

The above summary of the present invention is not intended to describe each disclosed embodiment of the present invention. This is the purpose of the figures and the detailed description which follow.

BRIEF DESCRIPTION OF THE FIGURES

Other aspects and advantages of the invention will become apparent upon reading the following detailed description and upon reference to the drawings in which.

While the invention is susceptible to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE INVENTION

The present invention is directed to a fishing device useful for indicating when a fish has struck a bait or lure. The fishing device may be used with a rod and reel, or any other angling devices that uses fishing line and hooks, such as simple ice-fishing poles that do not contain a reel but rather store line by manually wrapping it around a pair of guides.

Figure 1:
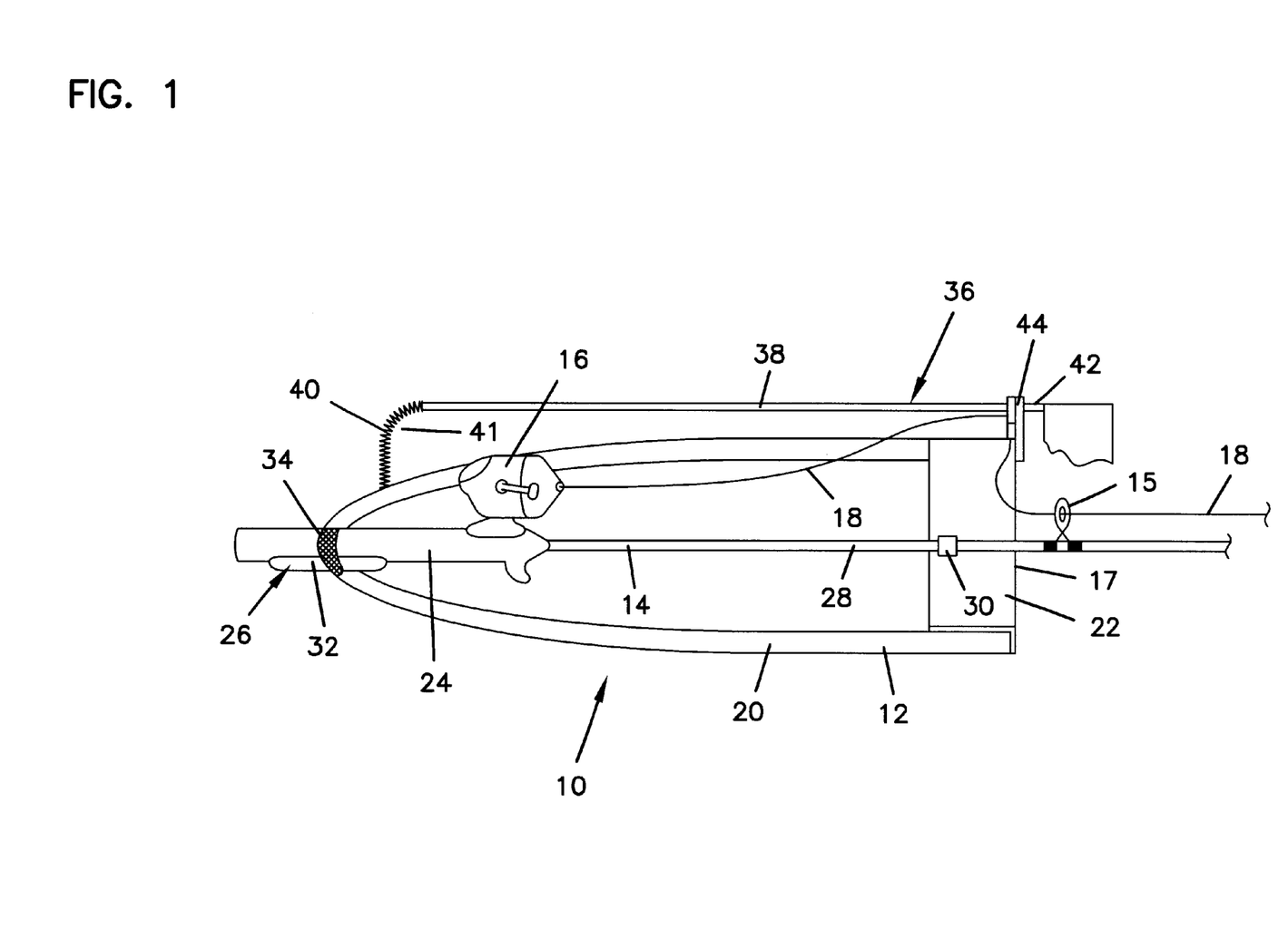
FIG. 1 is a perspective view of a tip-up device constructed and arranged in accordance with the present invention, showing the tip-up device with a fishing rod and reel installed and a flag in the un-sprung position.
Figure 2A:
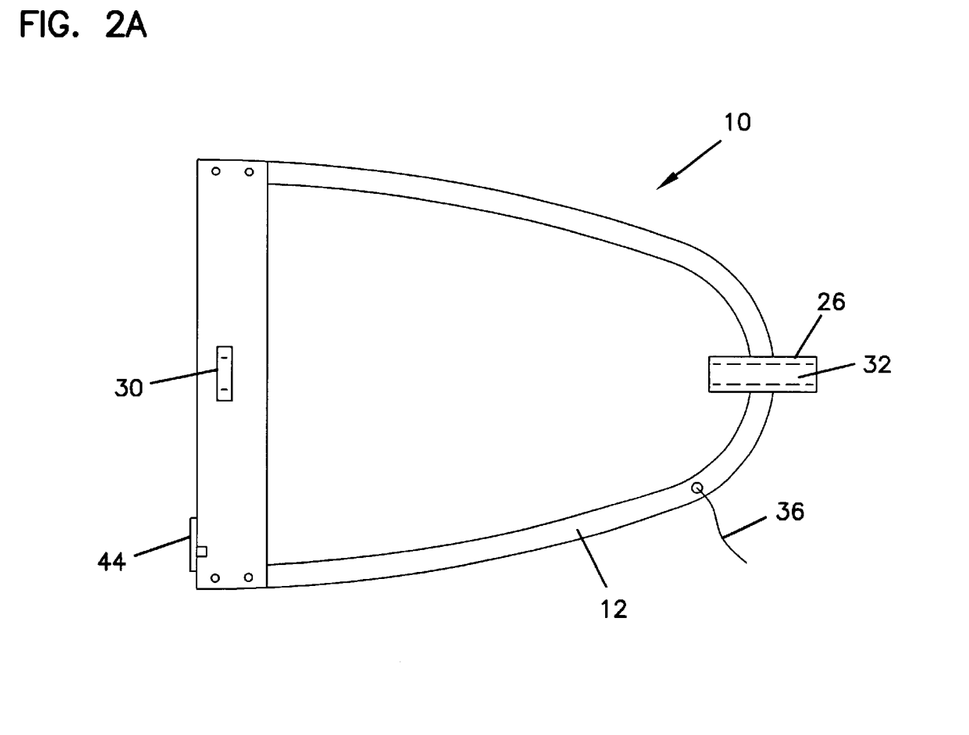
FIG. 2A is a top elevational view of the tip-up device shown in FIG. 1 with the fishing rod and reel removed, and the flag in the sprung position.
Figure 2B:
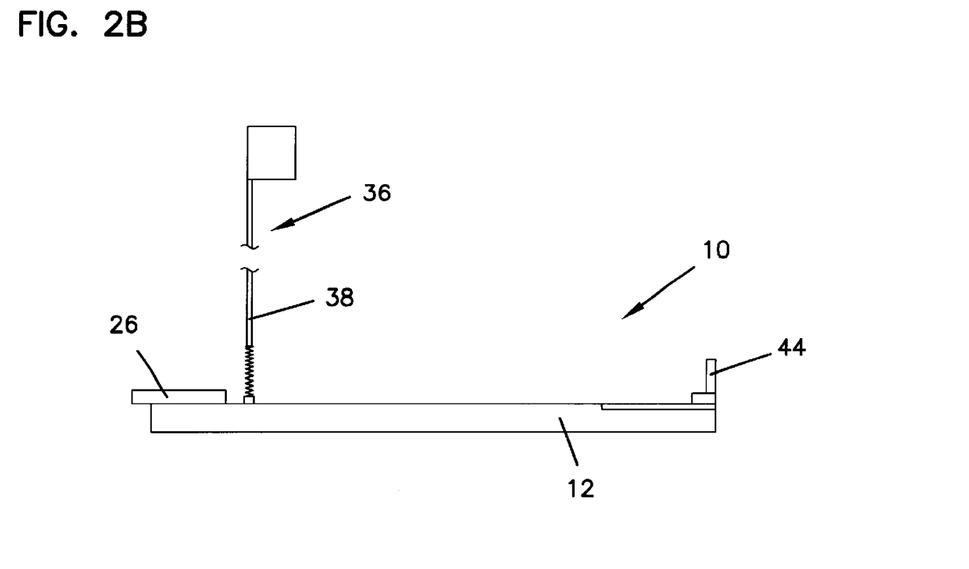
FIG. 2B is a side elevational view of the tip-up device shown in FIG. 2A.

In reference now to the figures, FIG. 1 shows a fishing device, more particularly a tip-up device 10 constructed and arranged in accordance with an implementation of the present invention. Tip-up device 10 includes a base 12 configured and arranged to retain a removable fishing rod 14 and reel 16 containing fishing line 18. In addition, in the depicted example, the rod 14 includes a line guide 15 positioned just past the front edge 17 of the base 12. FIGS. 2A and 2B show the same tip-up device 10 in top elevational and side elevational views, without the rod and reel present.

In the embodiment shown, the base 12 is a bent piece of tubing 20 including a planer metal plate 22 at one end of the base 12. While the embodiment shown in FIG. 1 is a specific implementation of the invention, it will be appreciated that the base 12 can have various configurations, and can be made of a single piece of material or multiple separate pieces. The base 12 can be made out of such materials as plastic, metal, or wood, and is injection molded out of a plastic material in certain implementations of the invention.

The handle 24 of the rod 14 is secured to the base 12 by bracket 26; and the shaft 28 of the rod 14 is secured to base 14 by bracket 30. The brackets 26 and 30 retain the rod 14 and reel 16 in place while the device 10 is in use and awaiting a strike from a fish. However, once a strike is detected (by the flag, as described below), the rod and reel 14, 16 are easily removed from the brackets 26, 30. In the embodiment shown in FIG. 1, the bracket 26 includes a curved channel 32 over which an elastic strap 34 is positioned to retain the handle 24 of the rod 14. The bracket 30 includes a slot for insertion of the shaft 28 of the rod 14, but the shaft is easily removed by lifting upward with the handle 24 of the rod 14.

The tip-up device 10 also includes a flag 36, the flag 36 having a shaft 38 with a first end 40 configured to be flexibly secured to the base 12 and a second end 42 distal from the first end 40. The flag is connected to the base 12 by means of a spring 41 in the embodiment shown. Spring 41 allows the flag 36 to pivot between a horizontal and vertical position. Spring 41 is biased so as to retain the flag 36 in a substantially vertical position except when the flag is retained in trigger mechanism 44.

Figure 3A:
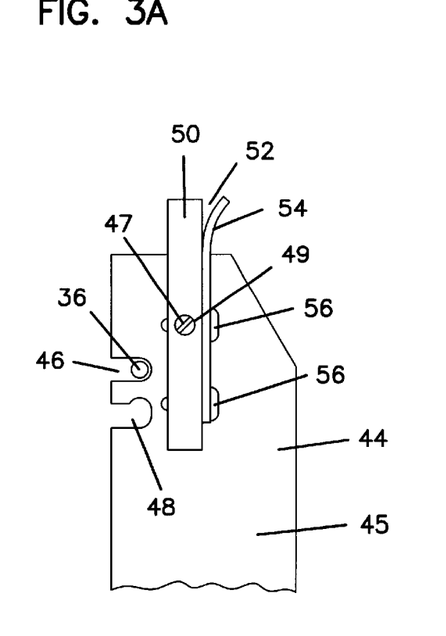
FIG. 3A is an end view of a first flag trigger mechanism constructed and arranged in accordance with the present invention, showing the mechanism prior to being triggered and with the flag shaft in cross section in an un-sprung position.
Figure 3B:
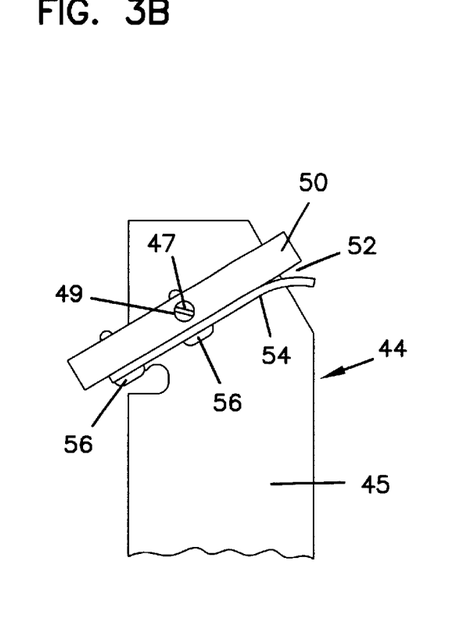
FIG. 3B is an end view of the flag trigger mechanism of FIG. 3A showing the mechanism after it has been triggered.
Figure 3C:
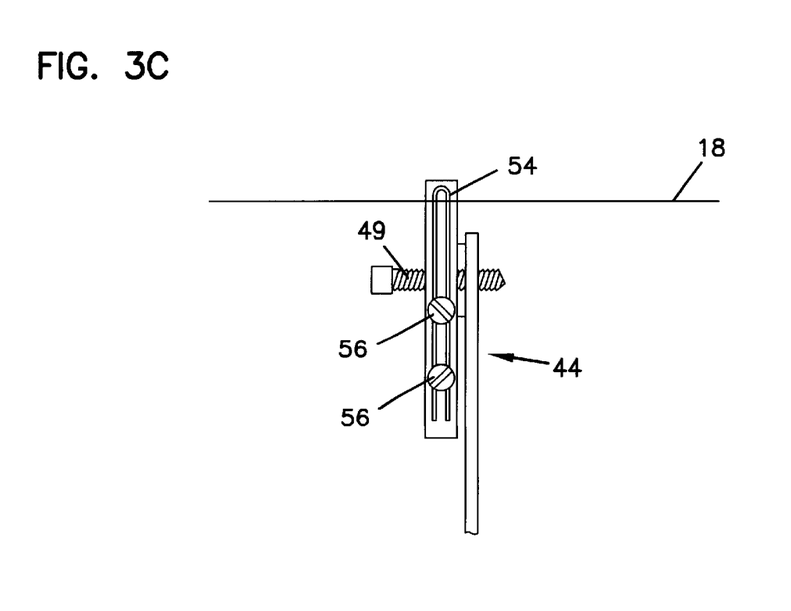
FIG. 3C is a side elevational view of the flag trigger mechanism shown in FIG. 3A and 3B.

In reference now to FIGS. 3A, 3B, and 3C, the trigger mechanism 44 of the described embodiment is shown in greater detail. Trigger mechanism 44 includes a support column 45 and is positioned on the base 12 and controls the release of the flag 36. In the embodiment shown, trigger mechanism 44 contains at least one slot 46 for insertion of the second end of the flag shaft (the embodiment depicted also has a second slot 48 that can be used instead of the first slot 46). A pivoting trip lever 50 is secured to the column 45 at pivot point 47 by means of adjustment screw 49, and is configured to releasably secure the fishing line 18 proximate groove 52. Groove 52 is formed in the disclosed embodiment by securing a bent spring wire 54 to the pivoting trip lever 50. The wire 54 provides a pressure against the pivoting lever 50 by screws 56.

When a fish strikes a lure or bait connected to the line 18, the line is drawn tight, forcing a rotation of the trip lever 50 along the pivot point 47. This rotation results in physical contact being made between the lever 50 and the shaft of the flag 36 that is within the slot 46 (or 48). The shaft of the flag is forced out of the groove 46, and once out of the groove the biased spring flexes and the flag rotates from a horizontal position to a vertical position to make it apparent to an observer. The line 18 optionally falls out of the groove 52 and allows the line to freely flow from the rod and reel until the line flow is arrested by the angler as he or she sets the hook. This ability to have the line flow freely until set by a user can be advantageous because it allows the line continue to feed out until the hook is set, thereby avoiding having the fish spit out the bait due to tension on the line.

Depending upon the type of fishing being done, the strength of the fish strikes may be variable. For example, a person fishing for a small fish such as a crappie, which typically weighs only about a pound, can expect far lighter strike than one from a northern pike, which often weighs much more than 10 pounds. In order to accommodate various strike strengths, the pivot point may contain a screw and spring that allow for variation of the pressure on the trip lever 50. By tightening the screw, the pivot point has greater resistance, which means that a stronger strike will be necessary in order to release the flag. This feature is also advantageous when using large live bait, such as chubs, which can pull relatively hard on the line and will create a false strike if the trip lever can be tripped too easily. This feature is also advantageous because it reduces the number of false strikes associated with light nibbles from fish.

Another way of controlling the strike sensitivity is by angling the slots 46, 48 to have an upward incline (as shown in slot 48). This upward incline, which can include a notched portion, provides greater retention of the flag shaft because the shaft must move along the incline against the force of the spring 41. The greater the incline, the harder it is to remove the shaft and thus the lower the sensitivity of the tip-up device. It will be appreciated that more than two slots may be incorporated to the column 44. Therefore, in specific implementations of the invention the sensitivity of the tip-up device 10 can be adjusted to accommodate different fish strike strengths, while still allowing the line to freely travel from the reel after the strike until the hook is set.

In a specific implementation, when the flag is in a first substantially horizontal position the second end of the flag may be placed within the slot of the trigger mechanism and upon pulling on the fishing line the pivoting trip lever of the trigger mechanism rotates to expel the second end of the flag from the trigger mechanism such that the flag is free to pivot into a vertical position.

With regard to the flag, it may be joined to the base by a flexible spring or rubber piece. The base may include a peg, and the flag may be removably secured to the base by insertion of the flexible spring over the peg. In a preferred embodiment, the eye of the rod is kept substantially perpendicular to the trip lever. A buzzer or bell may be incorporated in addition to the flag to provide an audible indication of the presence of a strike.

In reference now to FIGS. 4, 5, 6 and 7, additional implementations of the trigger mechanism are shown. In FIG. 4A and 4B, a trigger mechanism 59 is shown having a trigger member 60 that pivots around pivot point 62 to retain the flag shaft 64. Trigger member 60 includes trigger arm 66 which retains the flag shaft 64 in a slot 68 within a mount 69. The trigger arm 66 is held in place by a release member 70 that locks with the arm 66 to keep it in place. Release member 70 includes a pivot point 72 in the implementation shown, as well as a catch 74 for securing the fishing line. The flag shaft 64 holds the arm 66 in place against the release member 70 by applying an upward force from the spring securing the flag to the base (not shown). In use, when a fish strikes a lure the release member 70 is pulled to the left (pivoting around pivot point 72) to free the arm 66 of the flag trigger member. Arm 66 is forced upward by the flag shaft 64.

Figure 4A:
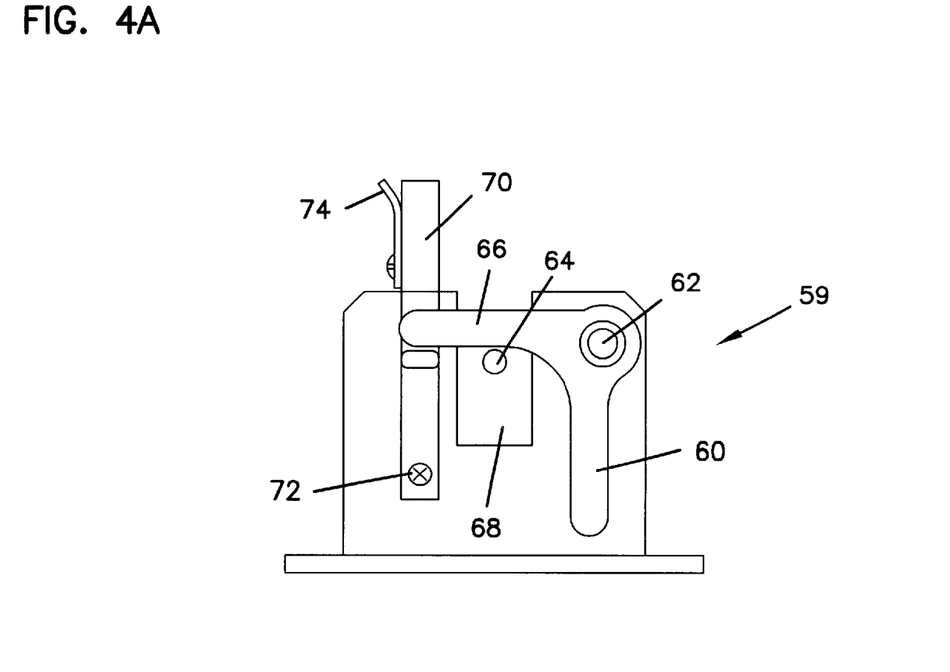
FIG. 4A is an end view of a second flag trigger mechanism constructed and arranged in accordance with the present invention, showing the flag shaft in cross section.
Figure 4B:
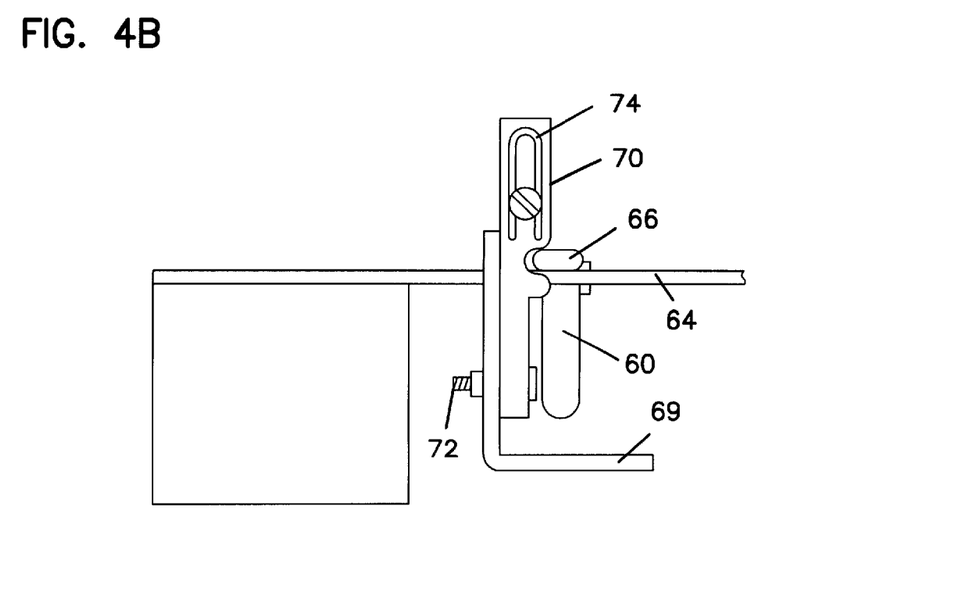
FIG. 4B is a side elevational view of the flag trigger mechanism shown in FIG. 4A.
Figure 5A:
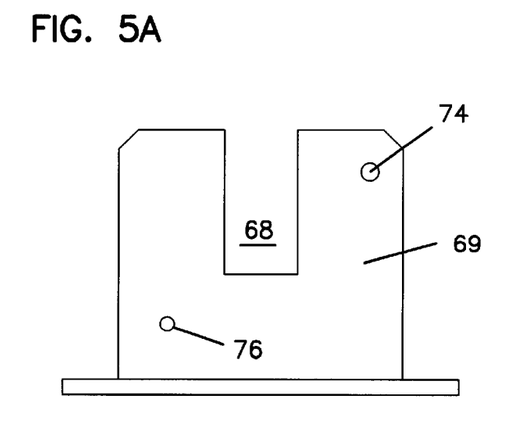
FIG. 5A is an end view of a support column for the flag trigger mechanism shown in FIGS. 4A and 4B.
Figure 5B:
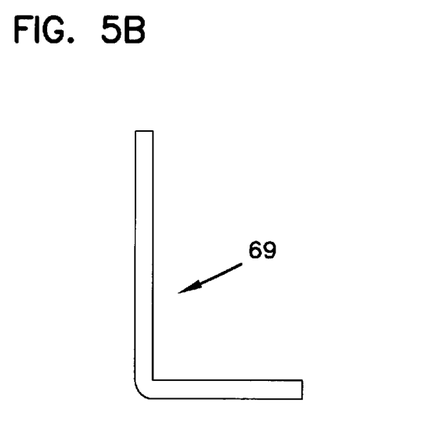
FIG. 5B is an side view of a support column for the flag trigger mechanism shown in FIGS. 4A and 4B.
Figure 5C:
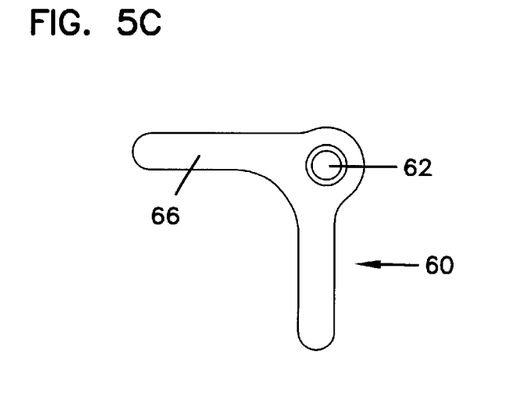
FIG. 5C is an end view of a locking lever for the flag trigger mechanism shown in FIGS. 4A and 4B.
Figure 5D:
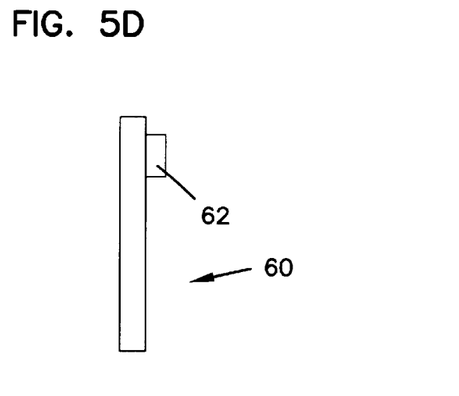
FIG. 5D is a side view of a locking lever for the flag trigger mechanism shown in FIGS. 4A and 4B.
Figure 5E:
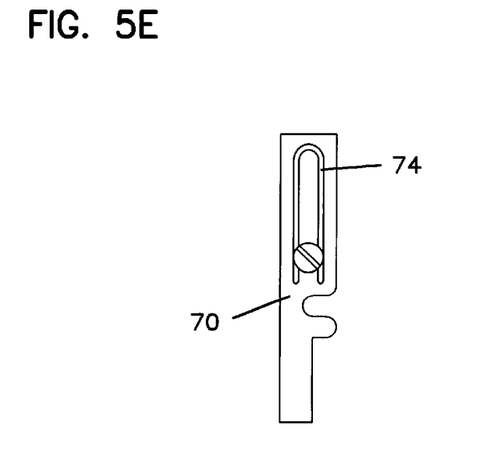
FIG. 5E is an end view of a pivoting trip lever for the flag trigger mechanism shown in FIGS. 4A and 4B.
Figure 5F:
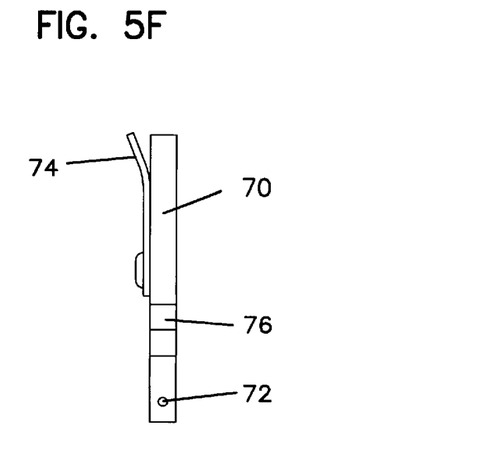
FIG. 5F a side view of a pivoting trip lever for the flag trigger mechanism shown in FIGS. 4A and 4B.

Trigger mechanism 59 is shown in side view in FIG. 4B, showing the interlock 76 between release member 70 and the trigger arm 66. The catch 74 is shown, as are various other aspects of the mechanism. Components of the mechanism from FIGS. 4A and 4B are shown individually in FIGS. 5A to 5F. In FIG. 5A, the mount 69 is shown with slot 68. In addition, holes 74, 76 for the pivot points are depicted. FIG. 5B shows mount 69 in side view. Trigger member 60 is shown in end and side views in FIGS. 5C and 5D, respectively. The release member 70 is shown in end and side views in FIGS. 5E and 5F, including a groove 76 for receiving the arm 66.

Figure 6A:
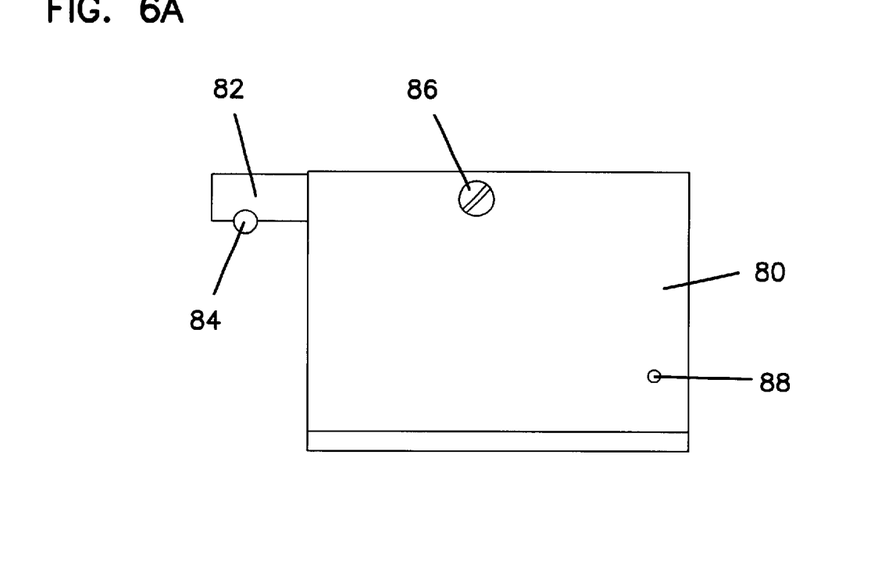
FIG. 6A is a front end view of a trigger mechanism constructed and arranged in accordance with the present invention.
Figure 6B:
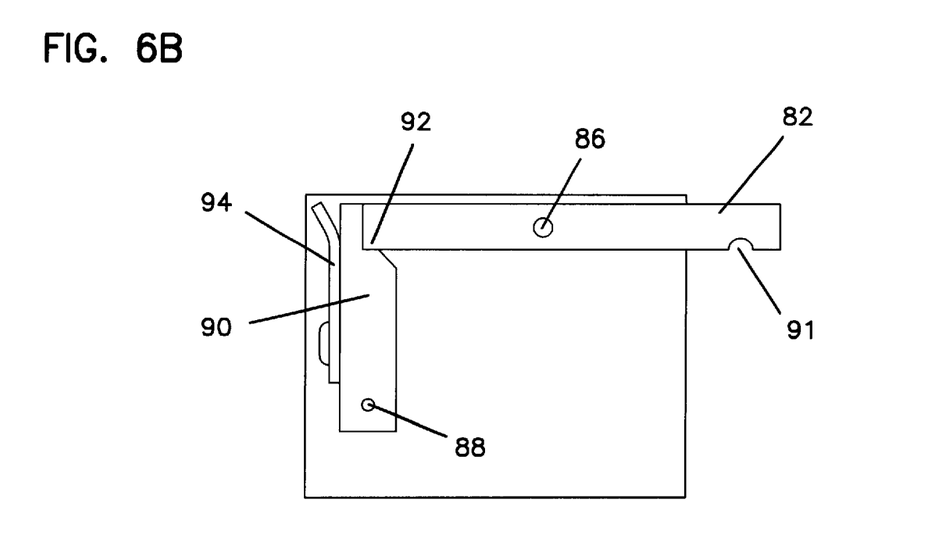
FIG. 6B is a back end view of the trigger mechanism shown in FIG. 6A.

An additional trigger mechanism is shown in FIGS. 6A and 6B. The front view, shown in FIG. 6A, depicts a mount 80 and a portion of a retainer member 82 along with a flag shaft 84 shown in cross section. First and second pivot points 86, 88 are also shown. FIG. 6B shows that retainer member 82 pivots around pivot point 86, with release 90 holding the catch retainer member 82 in place until a fish strikes. The flag shaft 84 fits within groove 91. The upward force of the flag (from the mounting spring, not shown) results in a downward force on the release 90 at intersection 92. When a fish strikes a bait, a line run behind or through the line retainer 94 to release retainer member 82 and allow flag shaft 84 to flex upward.

Figure 7A:
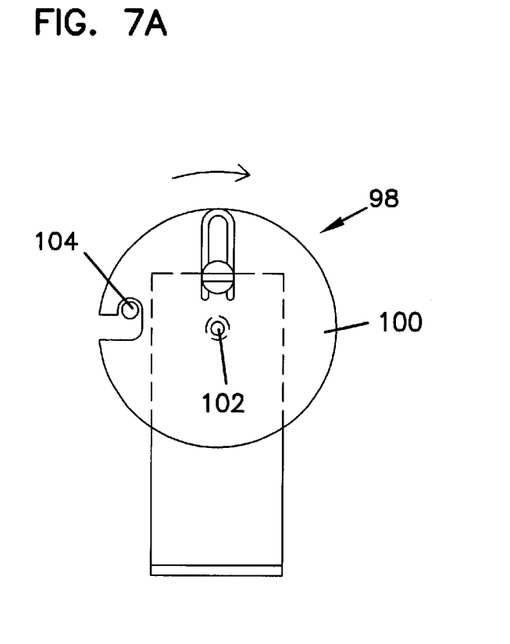
FIG. 7A is an end view of an additional flag trigger mechanism constructed and arranged in accordance with the present invention, showing the flag shaft in cross section.
Figure 7B:
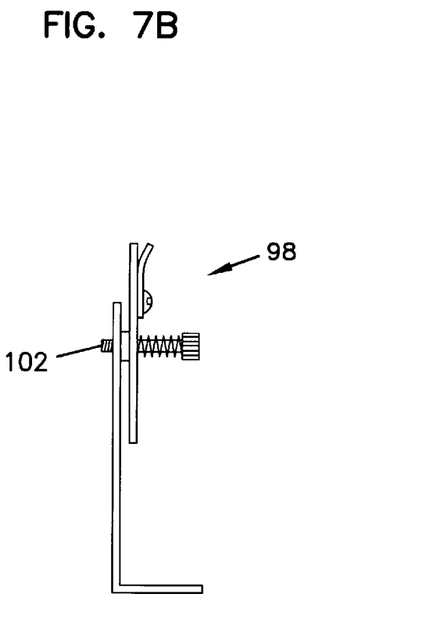
FIG. 7B is a side elevational view of the flag trigger mechanism shown in FIG. 7A.
Figure 7C:
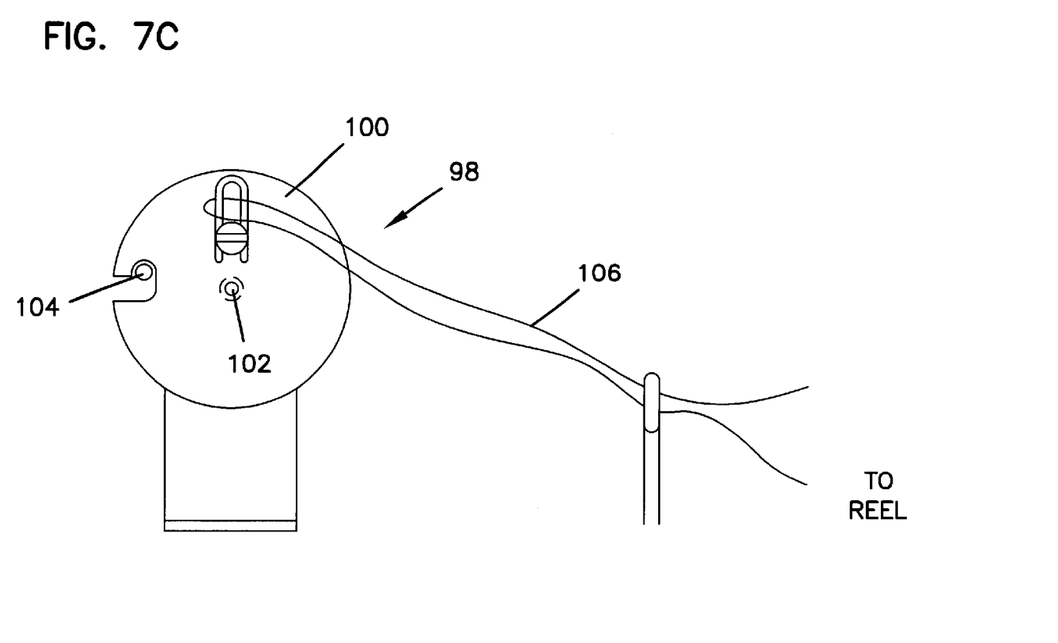
FIG. 7C is an end view of the flag trigger mechanism shown in FIG. 7A, showing a fishing line threaded through the trigger mechanism.

Yet another trigger mechanism 98 is shown in FIG. 7A, which includes a rotating retainer member 100 that rotates around pivot point 102 and retains flag shaft 104. Upon having a bait struck, the line 106 causes the retainer member 100 to rotate, releasing the flag 104.

Other embodiments of the invention will be apparent to those skilled in the art from consideration of the specification and practice of the invention disclosed herein. It is intended that the specification and examples be considered as exemplary only, with a fall scope and spirit of the invention being indicated by the following claims.

We claim:

1. A tip-up device for use in identifying a fish strike while angling, the tip-up device comprising:

a base configured and arranged to retain a removable fishing rod and reel containing fishing line;

a flag, the flag having a shaft with a first end configured to be flexibly secured to the base and a second end distal from the first end; and a trigger mechanism containing a plurality of stationary slots for insertion of the second end of the flag shaft, and a pivoting trip lever configured to releasably secure the fishing line with a compressive force;

wherein when the flag is in a first substantially horizontal position the second end of the flag may be placed within one of the stationary slots of the trigger mechanism and upon pulling on the fishing line the pivoting trip ever of the trigger mechanism rotates to expel the second end of the flag from the trigger mechanism such that the flag is free to pivot from the first horizontal position into a second substantially vertical position, wherein the pivoting trip ever includes a first end configured to releasably secure the fishing line, a second end configure to expel the second end of the flag shaft from the one of the slots, and a pivot point intermediate the first and second ends; and wherein the lever is pivotable about an axis parallel to axes of the slots and the lever expels the flag from the one of the slots when the second end of the lever rotates from a first position which is away from the axis of the one of the slots to a second position which crosses the axis of the one of the slots.

2. The tip-up device in accordance with claim 1, wherein the shaft may be removed from the base by lifting the rod in a vertical direction.

3. The tip-up device in accordance with claim 1, wherein the flag is joined to the base by a flexible spring.

4. The tip-up device in accordance with claim 1, wherein the base includes a peg, and the flag is removably secured to the base by placement of the flexible spring over the peg.

* * * * *